L. LEFEVRE.
AUTOMOBILE BODY SUPPORTING MEANS.
APPLICATION FILED JULY 1, 1916.
1,236,323.
Patented Aug. 7, 1917.
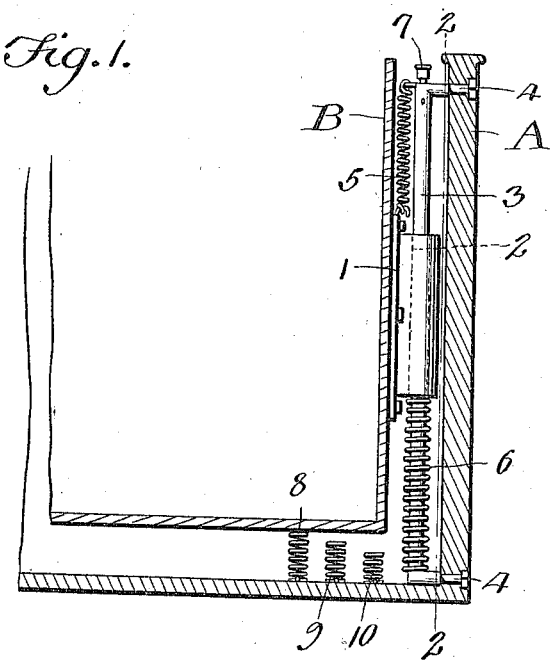
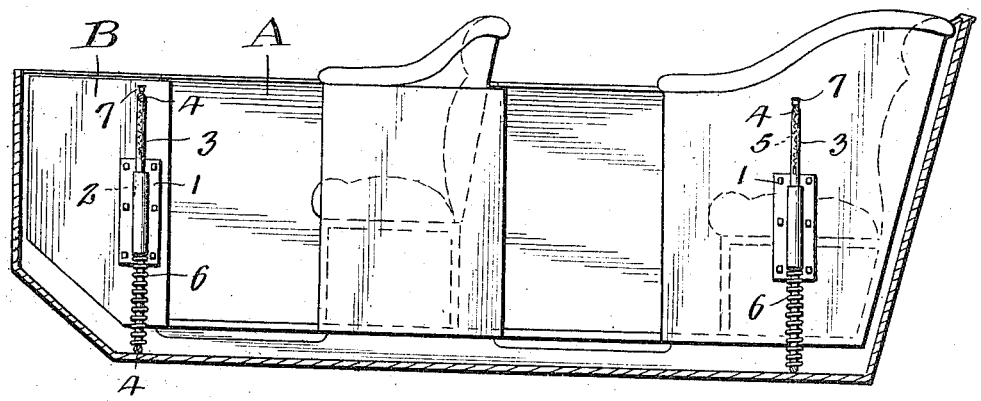
Witnesses
Inventor
L. Lefevre,
By Victor J. Evans
Attorney

UNITED STATES PATENT OFFICE.

LORIN LEFEVRE, OF ST. PETER, MONTANA.

AUTOMOBILE-BODY-SUPPORTING MEANS.

1,236,323.  Specification of Letters Patent.  Patented Aug. 7, 1917.

Application filed July 1, 1916. Serial No. 107,111.

*To all whom it may concern:*

Be it known that I, LORIN LEFEVRE, a citizen of the United States, residing at St Peter, in the county of Cascade and State of Montana, have invented new and useful Improvements in Automobile-Body-Supporting Means, of which the following is a specification.

This invention relates to auto body supporting means, the object in view being to provide in connection with the ordinary spring supported body of an automobile or similar vehicle, a supplemental body located interiorly of the main body and suspended and yieldingly supported or hung therein in such manner that the ordinary road shocks will be absorbed by the supporting means for the supplemental inner body while excessive shocks will be cushioned and absorbed by the usual body supporting springs in conjunction with the means whereby the inside or supplemental body is yieldingly supported or hung.

With the above and other objects in view, the invention consists in the novel construction, combination and arrangement of parts, as herein described, illustrated and claimed.

In the accompanying drawings:—

Figure 1 is a sectional view through a sufficient portion of the body of an automobile to illustrate the supplemental body and its supporting means in relation to the main body.

Fig. 2 is a section on the line 2—2 of Fig. 1.

Referring to the drawings A designates the main body of an automobile or similar vehicle and B an auxiliary or supplemental body located interiorly of the main body A. In connection with the bodies A and B, I employ a series of supporting or hanging devices each comprising a runner 1 which is fastened in fixed relation to the body B, said runner being formed with a vertical guide way 2 through which passes a guide rod or bar 3 fastened at its upper and lower extremities to the body A. The guide 3 is shown as having its upper and lower extremities bent substantially at a right angle to form stud bolts 4 which are secured fixedly to the body A in such manner that the guide 3 is arranged in spaced relation to the body B to allow for the free up and down movement of the runner 1.

In connection with each runner 1, I employ a suspension spring 5 one extremity of which is attached to the runner and the other extremity of which is attached to the top of the guide 3 or to a fixed point of the body A. A compression spring 6 encircles the guide 3 below the runner 1, being interposed between the runner 1 and the stud bolt 4 at the lower extremity of said guide 3. 7 designates an oil cup located at the top of the guide 3 for lubricating the latter.

Beneath the body B are interposed several groups of cushioning springs, each group comprising springs 8, 9 and 10 of different lengths, the body B being primarily supported and cushioned by the longer spring 8, then additionally supported and cushioned by the spring 9 and finally by the spring 10, the body B being additionally cushioned by the springs 5 and 6 above referred to.

In the preferred embodiment of the invention four of such sets of springs are employed and the runners 1 are located on the opposite sides of the body B and in spaced relation to each other in a fore and aft direction as indicated in Fig. 2. However, as many of such sets of springs may be employed as may be found necessary in accordance with the size of the machine and therefore the size of the main and auxiliary bodies A and B.

Having thus described my invention, I claim:—

The combination with the main body of a motor vehicle, of an auxiliary body located interiorly of the main body, upright guide rods located between said bodies in spaced relation thereto and each having its upper and lower ends extended at right angles and inserted through the main body, fastening means for securing said angular end portions of each guide rod to the main body and accessible exteriorly thereof, tubular runners fastened to the auxiliary body and slidable longitudinally upon said guide rods, and cushioning means for said auxiliary body consisting of suspension springs each having its lower extremity attached to one of said runners and its upper extremity attached to the upper end of the adjacent guide rod, and compression springs surrounding said guide rods and interposed between the runners and the lower extremities of said guide rods.

In testimony whereof I affix my signature in presence of two witnesses.

LORIN LEFEVRE.

Witnesses:
ALBERT F. NEAL,
FRED H. ATEN.

Copies of this patent may be obtained for five cents each, by addressing the "Commissioner of Patents, Washington, D. C."